United States Patent
Loxley et al.

[15] 3,652,248
[45] Mar. 28, 1972

[54] PROCESS FOR REDRAWING SILICA GLASS RODS

[72] Inventors: Ted A. Loxley, Mentor; John M. Webb, Chagrin Falls; Walter G. Barber, North Perry, all of Ohio

[73] Assignee: Edward J. Mellen, Jr., East Cleveland, Ohio

[22] Filed: June 9, 1970

[21] Appl. No.: 44,791

[52] U.S. Cl. ........................................65/108, 65/120, 65/12, 65/13, 65/2, 65/DIG. 8, 65/DIG. 9, 65/DIG. 7
[51] Int. Cl. ..............................C03b 21/00, C03b 23/04
[58] Field of Search..................65/108, 120, 12, 13, DIG. 7, 65/DIG. 8

[56] References Cited

UNITED STATES PATENTS

| | | |
|---|---|---|
| 2,987,372 | 6/1961 | Olt et al. ...........................65/108 X |
| 3,037,241 | 6/1962 | Bazinet, Jr. et al. ..............65/DIG. 7 |
| 3,227,032 | 1/1966 | Upton................................65/DIG. 8 |
| 2,269,459 | 1/1942 | Kleist.................................65/13 X |
| 2,984,868 | 5/1961 | Hill....................................65/13 X |
| 3,045,278 | 7/1962 | Potter................................65/13 |

Primary Examiner—Frank W. Miga
Attorney—McCoy, Greene & Howell

[57] ABSTRACT

A process of redrawing a hollow quartz glass rod to close tolerances comprising feeding the rod vertically between motor-driven feed rolls, directing flames radially inwardly against the periphery of the rod to heat the glass to a drawing temperature above 3,000° F., and maintaining a tension on the rod to draw it and reduce its diameter at least 70 percent, characterized in that jets of cooling air are directed radially inwardly against the periphery of the heated glass about 1 to about 2 inches below the flame and above the zone of constant diameter to reduce the length of the tapered neck substantially and thereby provide better dimensional control.

9 Claims, 3 Drawing Figures

INVENTORS
TED A. LOXLEY
JOHN M. WEBB
WALTER G. BARBER
BY
McCoy, Greene, & Howell
ATTORNEYS

INVENTORS
TED A. LOXLEY
JOHN M. WEBB
BY WALTER G. BARBER

McCoy, Greene & Howell
ATTORNEYS

PROCESS FOR REDRAWING SILICA GLASS RODS

DESCRIPTION OF THE INVENTION

The present invention relates to the manufacture of small diameter silica glass rods and more particularly to a process of and apparatus for forming microbore quartz glass tubing which employs an air quench to maintain close tolerances.

Heretofore, quartz glass rods of small diameter (e.g., a diameter of 0.1 inch or less) have been made by redrawing glass rods in equipment of the type shown in FIG. 1 which includes a peripheral burner arrangement for directing flames radially inwardly against the outer surface of the quartz glass rod to soften the same and motor-driven glass drawing rolls which grip the rod and apply a tension thereto to draw it down to a small diameter. Such conventional redrawing operation was not satisfactory for production of quartz glass rods where accurate dimensional control was needed, particularly where tolerances of ±0.002 inch or less were required, because of the inability to prevent size fluctuations. Using known procedures, it was difficult to control such a redrawing process with sufficient precision to produce quartz glass rods within a tolerance range of ±0.003 inch. With such process, it was not feasible to attempt to meet tolerance ranges of ±0.001 inch and the cost of making small diameter rods to such close tolerances was too great.

The present invention solves the tolerance problems mentioned above and makes possible economical production of hollow quartz glass rods of very small diameter having accurately controlled dimensions. Even with crude equipment and measuring gauges accurate to no more than 0.001 inch, it is relatively simple to produce such rods consistently within a tolerance range of ±0.002 inch and with a reasonable percentage of rods within a tolerance range of ±0.001 inch.

The process of the present invention involves a simple change in the conventional glass redrawing process. A quartz glass rod is heated and softened by peripheral burners in the conventional manner and drawn by motor-driven tensioning rolls to reduce its diameter more than 70 percent. The glass necks down and cools as it moves downwardly away from the burners, and it becomes too hard to draw at a plane of constant diameter whose location fluctuates but generally remains a few inches below the burners. The present invention provides a means to help fix the location of that plane by directing cooling air against the hot glass just before it reaches such plane. The rapid cooling of the glass in this manner moves the plane of constant diameter a substantial distance (e.g., 0.3 to 1 inch) closer to the burners. Such cooling, when effected at the proper rate, does not cause devitrification or damage to the surface of the glass; however, excessive cooling is detrimental and makes it impossible to produce high quality glass rods. When the jets of cooling air are properly correlated with the burners in accordance with the present invention, it becomes possible to mass produce microbore tubing and glass rods of very small diameter economically with simple equipment while maintaining very close tolerances.

The present invention makes it possible for small manufacturing plants to produce microbore glass tubing using relatively simple and inexpensive equipment. No attempt is made to regulate the rate of cooling of the glass in accordance with flame fluctuations. Instead, the cooling jets provide a steady, uniform cooling. Although the rate of cooling provided in accordance with the invention is independent of flame fluctuations, such steady cooling has a surprising compensating effect.

Because the process of this invention minimizes the adverse effects of flame fluctuations, it makes possible an increase in the flame size and/or the diameter of the quartz glass rod. For example, the glass rod may have a diameter of 1 inch or more when making microbore tubing. A larger or hotter flame also makes possible an increase in the rate of drawing of the glass.

An object of the present invention is to provide a simple, inexpensive process of and apparatus for producing microbore quartz glass tubing having accurately controlled dimensions.

A further object of the invention is to provide a process for economical commercial production of microbore quartz glass tubing with dimensions accurate to within ±0.001 inch.

A still further object of the invention is to provide a process sufficiently reliable to permit economical commercial production of precision microbore quartz glass tubing with an external diameter of 0.005 to 0.015 inch.

Another object of the invention is to decrease the waste caused by rejection of a substantial proportion of redrawn glass rods as being of incorrect or uneven size or diameter.

Another object of the invention is to reduce the adverse effects of flame instability in a glass redrawing operation.

Another object of the invention is to provide a glass drawing process which can be performed at higher speeds with hotter flames.

These and other objects, uses and advantages of the invention will become apparent to those skilled in the art from the following description and claims from the drawings, in which:

Figure 1:
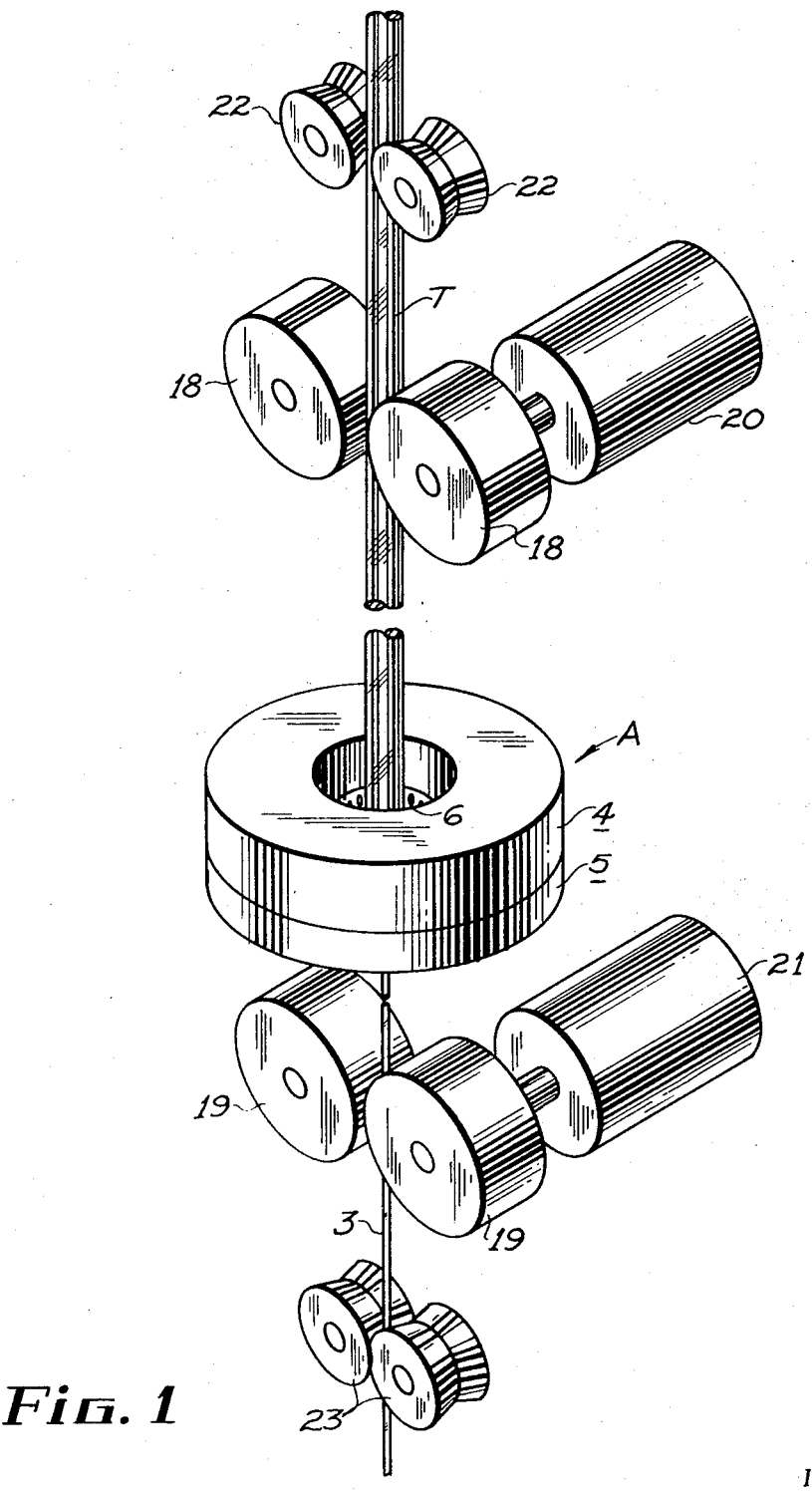
FIG. 1 is a schematic isometric view on a reduced scale showing a glass redrawing apparatus.
Figures 2, 3:
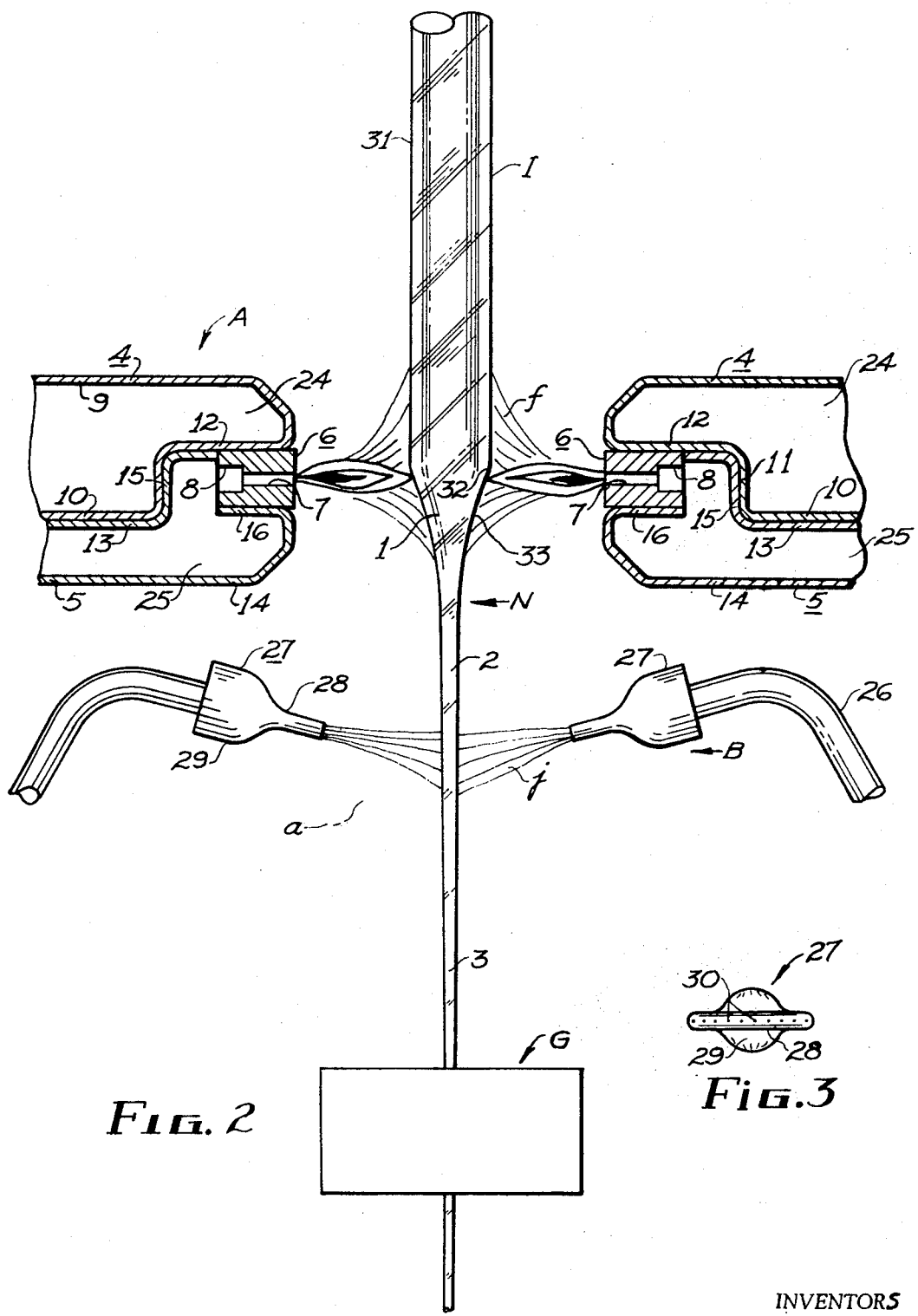
FIG. 2 is an enlarged fragmentary vertical sectional view of the glass redrawing apparatus of the present invention with the apparatus drawn substantially to scale.
FIG. 3 is an end view of the air nozzle used in the apparatus of FIG. 2.

FIGS. 1 and 2 show a glass redrawing apparatus which, except for the cooling means B, is of conventional construction. As shown a cylindrical quartz glass rod T is supported in a vertical position and slowly fed downwardly through a heating annulus or furnace A wherein flames f from the burner ring 6 are directed radially inwardly against the rod to heat it to a temperature above 3,100° F. sufficient for glass drawing. At this temperature the quartz glass glows and is highly plastic. Being subjected to tension, the glass necks down rapidly at the softened portion 1 which is contacted by the flames.

The glass in the neck N cools as it moves from the heated softened portion 1 to the congealing portion 2 of said neck from a drawing temperature above 3,100° F. in portion 1 at which it glows to a substantially lower temperature (e.g., 2,600° to 3,000° F.) in portion 2. As the glass cools it stops glowing, becomes harder, and finally reaches a zone of constant size wherein the hard portion 3 of the glass rod has a fixed cross-sectional size and shape. The horizontal plane $a$ where the hard portion 3 and the zone of constant size begin is indicated by dot-dash lines in FIG. 2. Applicants have discovered that the location of the plane $a$ fluctuates substantially with conventional glass redrawing equipment (without the cooling means B), particularly when the flame is unstable, and that fluctuations in the location of plane $a$ are accompanied by unwanted changes in the diameter of the finished glass tube.

The heating annulus A may be of conventional construction and includes closed upper and lower parts 4 and 5 and a cylindrical burner ring 6 of rectangular cross section clamped between said portions. The burner ring is concentric to the tube T and has a series of closely spaced radial passages 7 regularly spaced around its periphery and a series of counterbores 8, each coaxial with its associated passage 7.

The upper sheet metal part 4 of the annulus A provides a closed chamber 24 for receiving cooling water, which is constantly circulated to prevent overheating, and the lower sheet metal part 5 provides a closed fuel chamber 25, which receives a continuous supply of a hydrogen-oxygen mixture or other suitable air-fuel mixture.

The parts 4 and 5 may be of any suitable construction. As herein shown, the upper part 4 has a flat horizontal upper wall portion 9 and a bottom wall portion 10 which is also flat and parallel to portion 9, except for a vertical cylindrical portion 11 and a flat annular portion 12, which is parallel to the portion 9 and sealingly engages the flat upper surface of the burner ring 6. The lower part 5 has an upper wall portion 13, which conforms to the wall portion 10, including an annular raised portion 15, which conforms to the portions 11 and 12 and establishes communication between the chamber 25 and the radial passages 7 of the burner ring. The lower part 5 also has a flat bottom wall portion 14 parallel to the wall portion 9 and a flat inturned annular portion 16 which sealingly engages the flat bottom surface of the burner ring 6. The parts 4 and 5 are preferably bolted together or otherwise detachably connected to facilitate replacement of the burner ring 6 when the size of the drawn rod is to be changed. The example shown in FIG. 2 is for purposes of illustration, and it will be apparent that the construction of the burner unit may vary considerably.

In the particular equipment shown herein, the replaceable burner ring 6 has an internal diameter of 2.5 inches and has 30 bores 7 with a diameter of 0.030 to o.050 inch. At the inside of the ring, the bores 7 are regularly spaced circumferentially about one-fourth inch apart. The pressure on the hydrogen-oxygen mixture in fuel chamber 25 is preferably about 5 to 10 pounds per square inch above atmospheric pressure, but this may vary according to the size of the bores 7. The burner size may also have to be changed if a different fuel is employed as is well understood in the art. Generally, it is preferable to employ a burner ring of the type shown herein with an internal diameter of about 1½ to about 4 inches which directs the flames horizontally and radially inwardly against the glass rod to provide a narrow heating zone, the center of which is located in horizontal alignment with the bores 7.

The quartz glass rod T may be supported in a vertical position and fed through the heating unit A at a controlled speed by conventional drawing rollers or the like. As herein shown the unheated upper portion of the rod T is guided through a pair of idler rolls 22 and a pair of upper motor-driven drawing rolls 18. The lower portion 3 of the rod below the heating unit A is guided through a pair of lower motor-driven drawing rolls 19 and a pair of idler rolls 23. The upper and lower pairs of drawing rolls 18 and 19 are driven at predetermined speeds to effect the desired drawing of the glass by conventional constant-speed motor drive units 20 and 21, respectively. The lower rolls 19 are driven at a speed many times the speed of the upper rolls 18 to reduce the diameter of the rod T at least 70 percent and preferably 75 to 95 percent. The drawing rolls 18 and 19 grip the glass rod in the conventional manner to apply the tension necessary to effect the desired drawing of the glass. The idler rolls 22 and 23 assist the rolls 18 and 19 in holding the glass rod straight and coaxial with the burner ring 6 during the drawing operation.

The tension applied to the quartz glass rod T by the drawing rolls 18 and 19 may be controlled in the conventional manner, and the speed of such rolls may be regulated to obtain the desired drawing of the glass. As shown in FIG. 2 the radial passages 7 of the burner ring direct the flames radially inwardly against the glass rod T so that they impinge on the annular shoulder 32 where the glass drawing begins and on the soft highly plastic portion 1 of the rod where the drawing proceeds at a rapid rate. The heated outer surface 33 of the glass rod tapers downwardly from the shoulder 32 to the plane $a$ of constant size at a rate which is relatively high in the upper portion 1 of the neck N and which decreases as the glass cools and congeals in the lower portion 2 of the neck. Below such neck and beginning at the plane $a$, the hard portion 3 of the glass rod is cylindrical and has a fixed cross section. The portion 3 is cooled sufficiently to withstand the gripping pressure of the drawing rolls 19 which may be spaced 10 or 20 inches below the burner ring 6.

As herein shown the portion 3 passes through a conventional air-cooled thickness gauge G which measures the final diameter of the rod. This may be a relatively inexpensive gauge which is accurate only to within ±0.001 inch because the process of this invention minimizes fluctuations in the diameter of the finished rod. More accurate thickness gauges can be used, if desired, to permit better regulation of air and fuel flow and better control of final size. However, sophisticated and expensive equipment is not essential to obtain satisfactory results.

The present invention is characterized by the novel use of cooling or quenching means B to reduce the length of the neck N and, more particularly, quenching means for directing jets $j$ of a cooling gas radially inwardly against the lower part of the neck a fraction of an inch above the plane $a$ of constant size.

The cooling jets may be directed against the glass from an apertured ring similar to the ring 6, from a series of separately adjustable nozzles, or in various other ways as will hereinafter become apparent to those skilled in the art. As herein shown, the cooling jets are formed by separately adjustable nozzles 27 which are circumferentially spaced 180° apart and mounted in fixed positions on long 1/4-inch copper tubes 26, which may easily be bent to adjust the nozzles radially and/or vertically. Only two nozzles 27 are necessary, but it will be apparent that good results may also be obtained using three or more nozzles with a regular peripheral spacing. The nozzles are adjusted so that their discharge ends are spaced radially from the axis of the glass rod T a distance which is usually 0.5 to 2 inches and preferably about 1 inch.

The sizes and types of nozzles may be of an infinite variety. As herein shown, each nozzle 27 is a standard AGF 1253B nozzle made by American Gas Furnace Co. of Elizabeth, New Jersey having a straight row of 10 circular discharge openings 30 with a diameter of about 0.026 inch located in the flattened nose portion 28 of the nozzle. The round rear portion 29 of the nozzle is adapted to be rigidly mounted on the end of the 1/4-inch copper tube 26. Generally the air pressure in the tubes should be held constant between 5 and 15 pounds per square inch gage, preferably between 8 and 12 pounds per square inch. However, the air pressure used depends on various factors, such as the size and number of discharge openings in the nozzle and the distance from the nozzle to the glass rod T.

In carrying out the process of the present invention, use is made of a solid or hollow glass bar or rod T which may have a polygonal or noncircular cross section, but preferably has a circular cross section and a smooth cylindrical outer surface 30 with a diameter of about 0.3 to about 0.8 inch. Such glass rod consists essentially of vitreous silica and preferably consists of pure transparent quartz glass. The glass rod contains at least 99.9 percent silica and preferably at least 99.95 percent silica. It is preferably a drawn transparent quartz glass but some of the advantages of the invention may be obtained using a molded or drawn translucent glass, especially if it contains 99.95 to 99.99 percent silica.

The amount of heat applied to the glass by the burners at 6 depends somewhat on the type of silica glass being drawn and is such as to heat the glass to a drawing temperature of at least 3,000° F. and usually to 3,100° F. or higher so that the glass in the soft portion 1 of the neck N glows and is highly plastic.

While the heat may be applied to the glass rod T in various ways, it is preferable to use a burner ring, such as the ring 6, and to direct the flames radially inwardly against the periphery of the glass in a narrow peripheral heating zone. As herein shown the axes of the bores 7 are located substantially in a horizontal plane at the center of the heating zone, but such bores may be inclined somewhat (e.g., 0–10° relative to the horizontal. Such inclination preferably does not exceed 5° upwardly or downwardly but can sometimes be as much as 10° in a downward direction, particularly where the nozzles 27 are inclined upwardly to offset the effect of the downwardly deflected flames.

The rate of flow of fuel to the burner ring 6 must be carefully controlled and correlated with the rate of drawing to obtain the desired final diameter, and the pressure in the fuel chamber 25 should be constant to minimize fluctuations in the flames. Selection of the best conditions sometimes requires routine trial and error adjustments as is commonly done in conventional glass redrawing operations.

The process of this invention is particularly well suited to the production of microbore quartz glass tubing with an external diameter of 0.01 to 0.1 inch which is preferably cut to lengths not in excess of about 1 foot, usually lengths of about ½ inch to about 10 inches.

Except for the air quench means B, the apparatus shown in the drawings is conventional. In the conventional process, it was common practice to employ a transparent cylindrical rod T formed of pure quartz glass and having a diameter of 0.2 to 0.8 inch, to heat it to a temperature in the neighborhood of 3,100° F., and to draw it down to a final diameter of 0.020 to 0.10 inch. The amount of drawing was determined by controlling the speed of operation of the feed rolls 18 and 19 and the pressure on the fuel chamber 25 and by selecting a burner ring having bores 7 of the proper size. However, because of the normal fluctuations in the flame, the accuracy of the drawing process was poor. The percentage of small diameter rods or tubes produced within acceptable tolerance limits by such conventional process was too low to permit economical production and those skilled in the art had no practical solution to the problem prior to the present invention.

Applicants have discovered that, during such a conventional redrawing process, the plane $a$ of constant size moves upwardly and downwardly a substantial distance and the length of the neck N fluctuates greatly due to normal flame fluctuations. They have also found that, without eliminating such fluctuations, the undesirable effect thereof can be minimized by shortening the neck N and preventing excessive movement of said plane $a$. It is believed that, in the conventional process, the plane $a$ is likely to move one-fourth inch or more in either direction from its desired position because of normal flame fluctuations. Thus the minimum and maximum lengths of the neck N may vary almost one-half inch. The average length of the neck formed during such a conventional redrawing process depends on several variables including the percentage size reduction and is usually less than 4 inches. It may be about 3 to 3½ inches when forming glass tubing with an extended diameter of 0.050 inch and may be somewhat greater when forming smaller tubing.

The present invention directs jets of cooling gas against the lower congealing portion 2 of the neck to move the plane $a$ of constant size a substantial distance closer to the center of the heating zone. For example, when drawing a quartz glass rod with a diameter of 0.3 to 0.8 inches down to a final diameter of 0.02 to 0.08 inches, the cooling jets maintain the plane $a$ within 3 inches of the top of the neck N throughout the drawing operation and prevent excessive fluctuations in the location of such plane. The amount of cooling provided by the quenching means B during drawing of the glass rod by the process of this invention ordinarily should be such that the length of the neck N is at least 0.3 inch less than and preferably 0.4 to 1.0 inch less than the length of such neck when drawing the same rod to the same final diameter under comparable conditions in the conventional manner with the same equipment but without the cooling means B. The amount of cooling effected by the jets $j$ during the aforesaid drawing by the process of this invention is usually such that the temperature of the glass at the plane $a$ is at least 50° F. lower at that distance from the center of the heating zone than the glass temperature at the same location during the aforesaid drawing in the conventional manner. Such amount of cooling should be sufficient to compensate for normal flame fluctuations or for effective stabilization of the final rod diameter but should not be so great as to cause formation of a lumpy or uneven surface when the flame is steady.

The amount of air flow from the nozzles 27 may be adjusted by regulating the air pressure in the tubes 26 until best results are obtained, and, if desired, the tubes may be moved or bent to adjust the position of the nozzles. The best operating conditions for the quenching means B depends somewhat on the operation of the burners at 6. If there is excessive downward deflection of the flames, it may be desirable to increase the pressure of the air in the nozzles 27 or to provide the jets with a small upward inclination. However, best results are usually obtained by arranging the burner ring and the cooling nozzles generally as shown in FIG. 2 with the nozzles inclined downwardly at an angle of 5° to 10° or so.

The cooling gas employed with the quenching means B is preferably air or an inert gas, such as nitrogen, and it is preferably maintained at a constant pressure and substantially constant temperature regardless of fluctuations in the fuel pressure at chamber 25. While the cooling gas is usually maintained at a constant temperature between 65° F. and 100° F., preferably ambient temperature, it may be supplied at a temperature of 50° to 150° F. or more.

FIG. 2 attempts to show the general shape of the tapered neck N formed in the glass when carrying out the process of this invention, but it will be understood that the shape and length of the neck depends on many variables and is continually changing because of the fluctuations in the flames and in the location of the plane $a$.

The tapered neck begins at the shoulder 32 formed at the bottom of the cylindrical surface 31 of the quartz glass rod T and extends to the horizontal plane $a$ of constant size which marks the beginning of the cylindrical surface 3 of the drawing rod. The diameter of the rod is constantly reduced as the glass moves downwardly from the shoulder 32 to the plane $a$ at a constantly diminishing rate as the glass cools and hardens. Such rate is relatively high in the soft upper portion 1 of the neck where the glass is highly plastic and glows. In the lower congealing portion 2 of the neck the rate of drawing is much lower and becomes negligible near the bottom of the neck.

The cooling jets $j$ from each of the nozzles 27 are directed at cooling points on the periphery of the glass rod each located at a distance of no more than one-half inch and usually 0.1 to 0.4 inch from the plane $a$ of constant size, and such distance is preferably no more than 0.3 inch. Such distance is related to the amount of cooling provided by the jets $j$ and depends somewhat on the length of the neck N.

Measuring in a different way, the distance upward from each of such cooling points to the top of the neck N is greater than the length of the soft portion 1 and more than half the length of the neck N. Such upward distance is at least 1 inch and preferably no greater than about 2½ inches. Such distance and the pressure in the nozzles 27 may be adjusted for best results. In general, it is preferable to locate each of the cooling jets $j$ so that it is directed radially inwardly against a point on the periphery of the glass spaced about 1 to about 2 inches from the center of the heating zone.

The cooling jets may be inclined 0° to 10° relative to the horizontal and are preferably inclined downwardly. The downward inclination may be 5° to 20° or more. Unless the flames extend downwardly too far down the neck, there is no advantage in inclining the cooling jets upwardly. Upward inclinations in excess of 10° are usually undesirable and can contribute to flame instability.

The amount of cooling air provided in the air jets $j$ should be sufficient to reduce the length of the neck N materially, as compared to the same drawing process without the quenching means B, and to compensate effectively for normal flange fluctuations so as to minimize changes in the length of the neck due to such flame fluctuations. Such amount is sufficient to maintain the plane $a$ of constant size within a small fraction of an inch (usually within 0.2 inch and preferably within 0.1 inch) of the desired location throughout the drawing operation and is preferably such as to provide good dimensional stability in spite of normal flame fluctuations so that the redrawn quartz glass rods or tubes have a final diameter accurate at least to within ±0.002 inch.

The thickness gauge G should be checked periodically to be sure that the fuel mixture and the cooling air are supplied in the proper amounts to obtain the desired final diameter. The degree of preciseness which can be obtained in this way is limited, especially if the gauge has only limited accuracy. However, with a standard air-cooled thickness gauge having an accuracy of about ±0.001 inch, a skilled operator using the process of this invention to produce microbore quartz glass tubing, can easily meet tolerance requirements of ±0.002 inch and, with due care, can produce a relatively high proportion of pieces with diameters within tolerance limits of ±0.001 inch.

The examples given below are intended to illustrate the invention rather than to limit it. In these examples, the process is performed using equipment as shown in the drawings with a burner ring 6 having an internal diameter of 2.5 inches and a pair of standard AGF 1253B nozzles for the cooling air radially inwardly and downwardly at an angle of 10° relative to the horizontal and spaced radially 1 inch from the axis of the glass rod.

With the above equipment, transparent cylindrical rods or tubes formed by drawing pure quartz glass and having a length of 3 to 6 feet and a uniform external diameter of 0.30 to 0.80 inch can be drawn by heating the quartz glass above 3,100° F. and drawing it uniformly to a final external diameter of 0.020 0.080 inch while directing the centers of the cooling jets against peripheral points on the glass located no more than 0.4 inch above the plane $a$ of constant size and maintaining the length of the neck N between 2 and 3 inches throughout the drawing operation.

Using such procedure in the manufacture of microbore quartz glass tubing, for example, a tube with an external diameter of 0.70 inch and an internal diameter of 0.40 inch can in one drawing operation be provided with a final external diameter of 0.070 inch and a final internal diameter of 0.040 inch within close tolerance limits even though the heating is accompanied by normal flame fluctuations. These may then be cut to the desired length (e.g., ½ to 9 inches) and classified after being measured for accuracy.

Using a similar procedure, the same equipment may be used to draw a quartz glass tube with an external diameter of 0.50 inch down to a final diameter of 0.010 inch. If desired the original glass rod or tube can have a diameter of about 0.38 inch, but the equipment shown in the drawings is not designed to handle rods of much smaller diameter. Equipment could be designed to redraw glass tubes with a diameter of 0.2 inch but there is no need for such equipment because the process of this invention makes it feasible to draw a quartz glass tube with a diameter of more than 0.4 inch down to a very small size diameter, such as 0.005 to 0.015 inch. The process of the invention minimizes fluctuations in neck length due to flame fluctuations and helps to shield the lower portion of the neck from the flame so that it is feasible to reduce the diameter as much as 98 or 99 percent in a single draw. It also makes it possible to produce with simple equipment a substantial proportion of pieces within rather close tolerance limits such as ±0.001 inch.

It will be understood that the constant air pressure supplied to the nozzles 27 in the above described examples may be varied considerably, e.g., between 8 and 12 pounds per square inch gage, and that the heat supplied to the burners can be adjusted in the usual manner in accordance with the particular requirements for the draw. Also, the nozzles 27 may be adjusted to different positions depending on the degree of drawing needed.

It will be understood that the above description is intended for illustration rather than limitation and that, in accordance with the provisions of the patent laws, variations and modifications of the specific devices and methods disclosed herein may be made without departing from the spirit of the invention.

Having described our invention, we claim:

1. In a process for precision redrawing of a silica glass rod having a diameter of 0.3 to 1 inch comprising the steps of supporting the rod in a vertical position between upper and lower tension-applying feed members, applying heat to the rod in a heating zone located between said feed members to heat the glass to a drawing temperature above 3,000° F., feeding the rod downwardly past upper feed member toward said heating zone, and pulling the drawn portion of the rod past said lower feed member at a greater speed to draw the rod and reduce its perimeter at least 70 percent while simultaneously forming a tapered neck with a length of several inches extending downwardly from said heating zone to a horizontal plane of constant size whose location fluctuates somewhat, said glass being allowed to cool and harden as it moves down from said heating zone to said last-named plane, the improvement which comprises directing a cooling gas against lower portions of said tapered neck near said last-named plane and spaced 1 to 2½ inches below the center of said heating zone to effect localized cooling of said lower portions and thereby minimize changes in the cross-sectional dimensions of the rod during the drawing operation while drawing the rod to a diameter between about 0.01 inch and about 0.1 inch.

2. A process as defined in claim 1 wherein said neck has a length up to 3 inches and the cooling gas is directed against portions of the neck located within about one-half inch of said plane of constant size.

3. A process as defined in claim 2 wherein the cooling gas engages peripheral portions of the glass rod which are spaced vertically about 1 to about 2 inches from said heating zone.

4. A process as defined in claim 1 wherein said localized cooling maintains the length of the tapered neck between about 2 inches and about 3 inches throughout the drawing operation.

5. A process as defined in claim 1 wherein said localized cooling reduces the glass temperature at least 50° F. and reduces the length of said tapered neck at least 0.3 inch.

6. A process as defined in claim 1 wherein said neck comprises a soft upper portion in which the diameter is reduced more than 70 percent and a lower congealing portion of greater axial length in which the diameter is further reduced to the final diameter at said plane of constant size and wherein the lower part of said congealing portion is subjected to said localized cooling to effect shortening of said neck.

7. A process as defined in claim 1 wherein said glass rod is hollow and said tapered neck has a length of about 1½ to about 2½ inches.

8. A precision redrawing process of the character described for forming small diameter glass tubing to close tolerances comprising supporting in an upright position between upper and lower tension-applying feed members a rod formed of a glass consisting essentially of vitreous silica and having a diameter of 0.3 to 1 inch, directing flames radially inwardly against the periphery of the rod in a heating zone located between said feed members to heat the glass to a drawing temperature above 3,000° F. at which it glows and is highly plastic, feeding the rod downwardly past said upper feed member toward said heating zone, and pulling the drawn portion of the rod past said lower feed member at a greater speed to draw the rod and reduce its perimeter at least 70 percent while simultaneously forming a tapered neck with a length of several inches extending downwardly from said heating zone to a horizontal plane of constant size at which the hardened glass resists further elongation, said rod being allowed to cool and harden as it moves down from said heating zone to said last-named plane and being reduced to a diameter of about 0.01 to about 0.1 inch, characterized in that a cooling gas is directed against lower peripheral portions of said tapered neck located within about half an inch of said last-named plane to effect localized cooling of said neck and to shorten the neck and maintain its length between about 2 inches and about 3 inches throughout the drawing operation.

9. A precision glass redrawing process as defined in claim 8 characterized in that circumferentially spaced jets of said cooling gas are directed radially inwardly against the periphery of said rod to shorten the neck at least 0.3 inch.

* * * * *